United States Patent
Burek et al.

Patent Number: 5,174,251
Date of Patent: Dec. 29, 1992

[54] S DIVIDER INTAKE

[76] Inventors: James M. Burek, 1217 Prairie Dr., El Paso, Tex. 79925; Orville F. Livingston, 729 Nita Fay, El Paso, Tex. 79912

[21] Appl. No.: 734,677

[22] Filed: Jul. 23, 1991

[51] Int. Cl.⁵ ............................................. F02M 25/10
[52] U.S. Cl. ................................................ 123/52 MV
[58] Field of Search ........ 123/52 M, 52 MV, 52 MC, 123/52 MB, 55 VE, 442, 590

[56] References Cited

U.S. PATENT DOCUMENTS

| 3,809,032 | 5/1974 | Morris | 123/52 MV |
| 3,915,128 | 10/1975 | Rich | 123/52 MV |
| 4,072,133 | 2/1978 | McWhirter | 123/52 MV |
| 4,109,619 | 8/1978 | Morris | 123/52 M |
| 4,318,371 | 3/1982 | McFarland | 123/52 MV |

FOREIGN PATENT DOCUMENTS

| 1111779 | 3/1956 | France | 123/52 MV |
| 0195855 | 12/1982 | Japan | 123/52 M |
| 1326745 | 7/1987 | Japan | 123/52 M |
| 0208511 | 8/1989 | Japan | 123/52 M |
| 0626238 | 8/1978 | U.S.S.R. | 123/52 MV |
| 1914849 | 12/1965 | United Kingdom | 123/52 MV |

Primary Examiner—David A. Okonsky

[57] ABSTRACT

Herein presented is a device for improving the fuel distribution performance of an automobile's intake manifold. The device is a partition that divides the carburetor barrels between the combustion cylinders. The partition divides the manifold. Certain barrels of the carburetor serve certain combustion cylinders and other barrels of the carburetor serve other combustion cylinders. The device is a marked improvement for automobiles whose combustion cylinders have a firing order of 1, 8, 4, 3, 6, 5, 7, 2.

2 Claims, 2 Drawing Sheets

S DIVIDER INTAKE

BACKGROUND OF THE INVENTION

Western civilization and in fact much of the world has had to become energy conscious. We are trying to conserve. Many grand plans have been proposed for conserving energy. The government of the United States has legislated the fuel consumption limits of its country's automobiles.

All aspects of the design of the automobile have been examined with fuel economy in mind. Automobiles are being made smaller and lighter. Improvements have been made in the ignition and fuel systems. The device herein presented improves fuel intake.

After gasoline and air are mixed in the carburetor, the fuel mixture is sucked through the carburetor barrels into the automobile's intake manifold. Within the manifold the flow of the fuel mixture can be obstructed by physical structures and by the opening and closing of the cylinder intake valves. Serious interference of the flow of the fuel mixture occurs with engines whose cylinders have a firing order of 1, 8, 4, 3, 6, 5, 7, 2. The outlet openings in the intake manifold for the 5 and 7 cylinders are adjacent, and at a range of engine speeds the closing of the intake valve for cylinder 5 interferes with the fuel mixture flow to the intake valve of cylinder 7. The device presented here separates the outlet opening to cylinders 5 and 7 and provides a separate fuel mixture source and flow for the two cylinders. The interference is eliminated.

SUMMARY OF THE INVENTION

The invention is a partition for the intake manifolds of automobiles. The intake manifold channels the flow of a fuel mixture of gasoline and air from the automobile carburetor to the intake valves of the combustion cylinders of the automobile. The partition divides the inside of the intake manifold. This division separates the openings in the intake manifold that lead to the individual, separate intake valves of the combustion cylinders. A portion of the partition runs under the bottom of the carburetor and separates the barrel openings at the bottom of the carburetor that empty the fuel mixture into the intake manifold. Fuel mixture from a particular barrel can only flow to certain cylinders because the partition prevents flow to the other cylinders. This can reduce some serious cross-current flows and interference from adjacent flows. Some portions of the partition are curved to further enhance the flow of the fuel mixture.

BRIEF DESCRIPTION OF THE INVENTION

The invention can be better understood by examining the following in connection with the accompanying drawings, to-wit:

DESCRIPTION OF THE PREFERRED EMBODIMENTS

Figure 1:
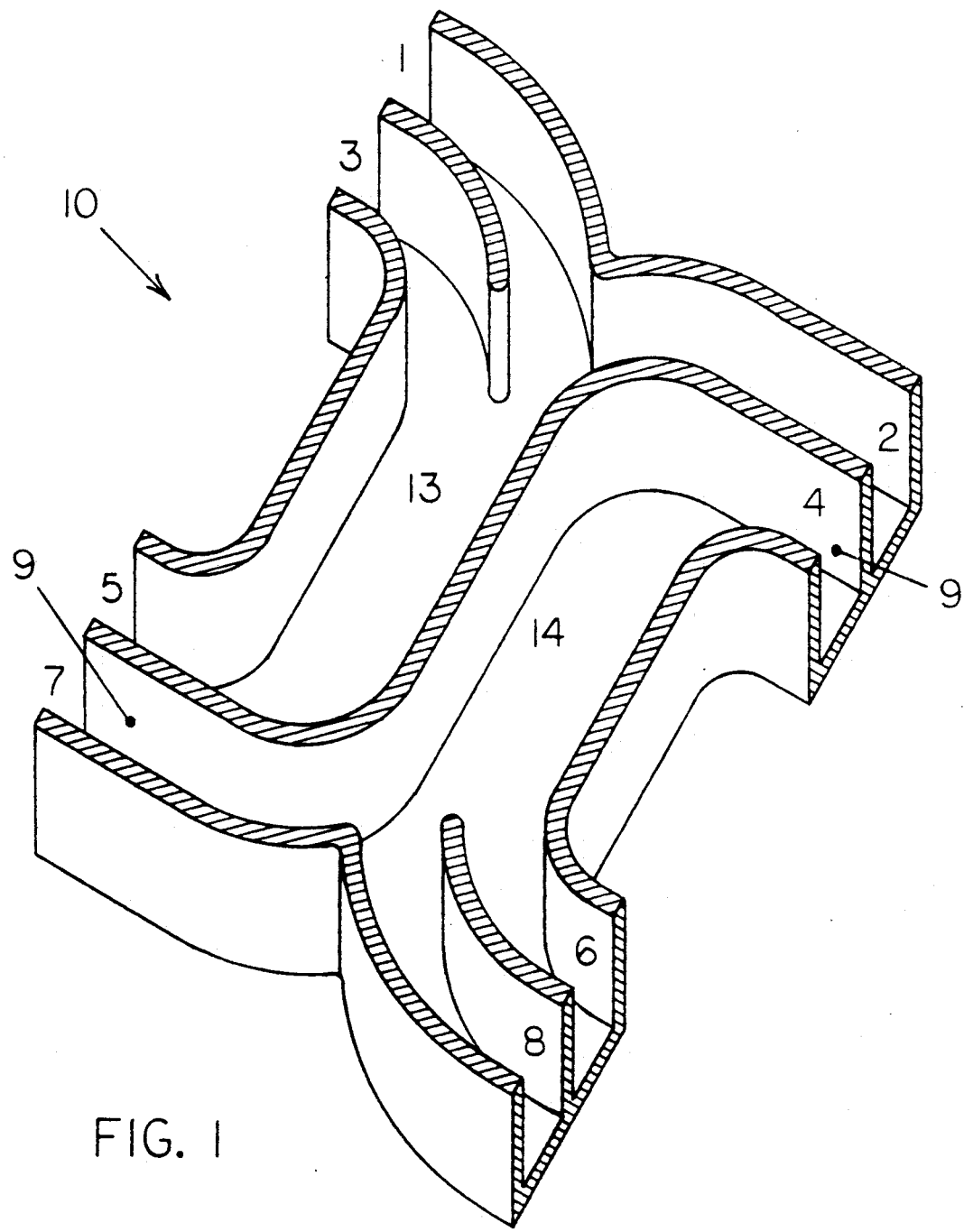
FIG. 1 is a view of the device and intake manifold looking down and at an angle from a corner of the intake manifold of an automobile without its top.

Referring now to the drawings and the preferred embodiments of the invention, FIG. 1 shows the device, a partition (9), within an intake manifold (10) that has outlets (1), (2), (3), (4), (5), (6), (7), and (8) that lead to combustion cylinders of an automobile. The partition (9) runs from one side of the manifold to its opposite other side. One end of the partition (9) separates outlets (5) and (7), and the other end of the partition (9) separates outlets (2) and (4). The partition (9) extends from the top of the manifold to its bottom, and completely separates outlets (5), (3), (1), and (2) from outlets (4), (6), (8), and (7). Inner space (13) of the manifold is completely separated from the inner space (14) of the manifold.

Figure 2:
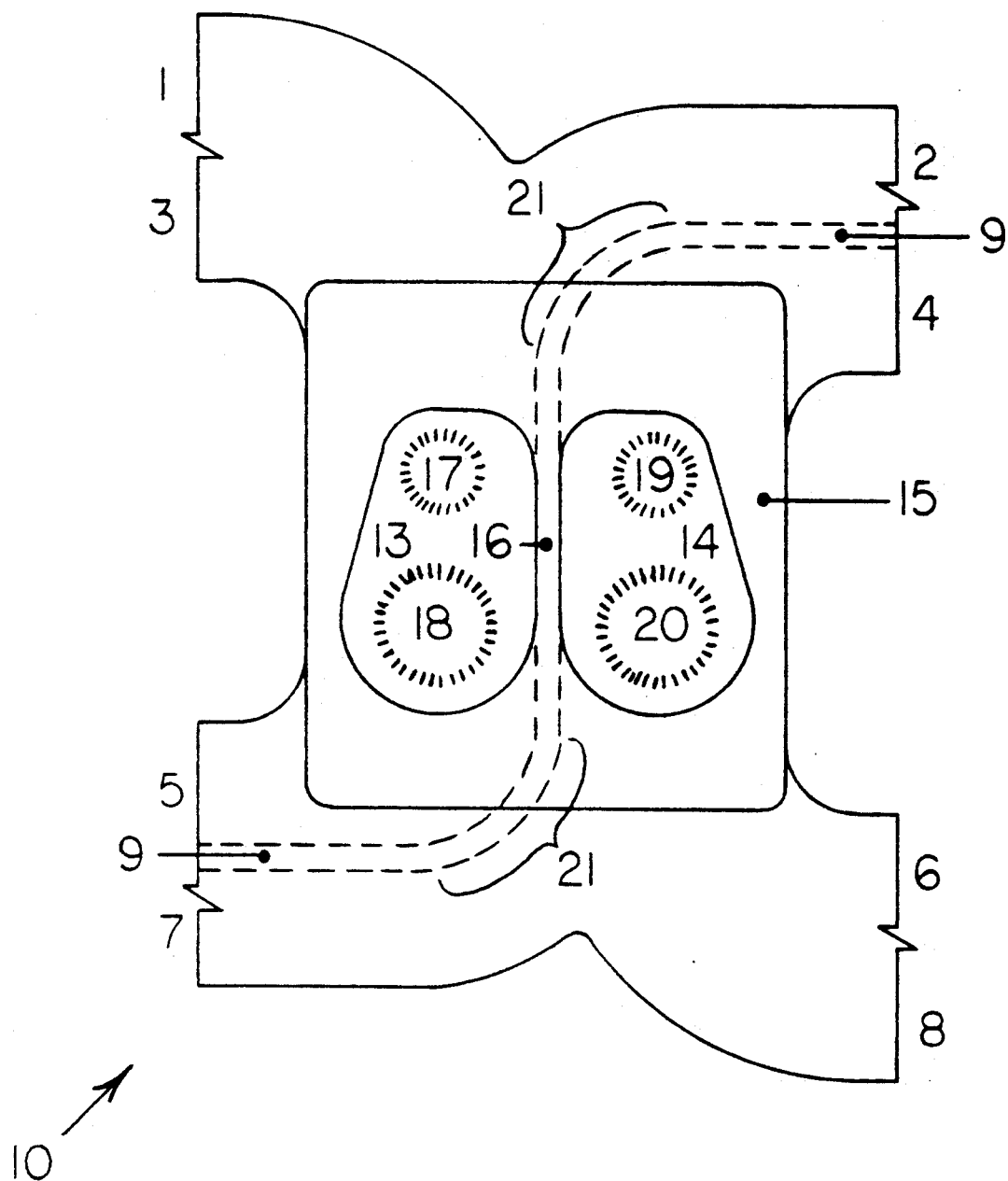
FIG. 2 is an overhead view looking straight down at the exact cross section where the bottom of the automobile's carburetor meets the top of the intake manifold.

FIG. 2 shows the juncture (15) of the automobile carburetor with the top of the intake manifold. The top of the portion (16) of the partition (9) that runs directly under the carburetor is shown in FIG. 2. The partition (9) separates the bottom openings of the carburetor barrels (17), (18), (19), and (20). The openings (17) and (18) pass fuel mixture only into the inner space (13) of the manifold, and the openings (19) and (20) pass fuel mixture only into the inner space (14) of the manifold. Thus, fuel mixture from openings (17) and (18) only flows to outlets (5), (3), (1), and (2), while fuel mixture from openings (19) and (20) only flows to outlets (4), (6), (8), and (7). Portion (21) of the partition (9) are curved to further enhance the flow of fuel mixture.

What is claimed is:

1. A partitioning device for an intake manifold of an automobile to improve fuel mixture flow and increase engine performance comprising: a partition that divides the inner space of the intake manifold of the automobile, said partition runs from one length wise side of said manifold to the opposite length wise side of said manifold, said partition runs in a diagonal manner, said partition extends from the top of said manifold to the bottom of said manifold, a portion of said partition runs under said automobile's carburetor, said portion of said partition that runs under said carburetor separates the bottom openings of the barrels of said carburetor, said partition divides said inner space of said manifold into two sections, fuel mixture from one half of said barrels of said carburetor flows only into one of said two sections, fuel mixture from the other one half of said barrels of said carburetor flows only into the other section of said two sections, fuel mixture from one half of said barrels of said carburetor flows only to one half of the combustion cylinders of said automobile, fuel mixture from the other one half of said barrels of said carburetor flows only to the other one half of the combustion cylinders of said automobile, portions of said partition are curved to enhance the flow of fuel mixture.

2. The invention in accordance with claim 1 except said manifold is for an automobile whose eight combustion cylinders have the firing order 1, 8, 4, 3, 6, 5, 7, 2, outlets to cylinders 5 and 7 are located at one end of one of said length wise sides of said manifold, outlets to cylinders 2 and 4 are located at the other end of the other said length wise sides of said manifold, said outlets for cylinders 5 and 7 are diagonal from said outlets for cylinders 2 and 4, one end of said partition separates said outlet for cylinder 5 from said outlet for cylinder 7, said other end of said partition separates said outlet for cylinder 2 from said outlet for cylinder 4, outlets for cylinders 2, 1, 3, and 5 are located in one of said two sections of said manifold, outlets for cylinders 4, 6, 8, and 7 are located in the other section of said two sections of said manifold.

* * * * *